US006666442B1

(12) United States Patent
Ploeger et al.

(10) Patent No.: US 6,666,442 B1
(45) Date of Patent: Dec. 23, 2003

(54) VEHICLE ENGINE HANGER

(75) Inventors: Randall J. Ploeger, Clarinda, IA (US); Marvin C. Negley, Clarinda, IA (US)

(73) Assignee: Lisle Corporation, Clarinda, IA (US)

( * ) Notice: Subject to any disclaimer, the term of this patent is extended or adjusted under 35 U.S.C. 154(b) by 0 days.

(21) Appl. No.: 10/382,980

(22) Filed: Mar. 6, 2003

(51) Int. Cl.[7] .............................................. B23Q 1/00
(52) U.S. Cl. ........................................ 269/46; 269/902
(58) Field of Search ........................... 269/46, 17, 126, 269/130, 902; 254/93 L, 120, 133 R, 134; 29/281.1

(56) References Cited

U.S. PATENT DOCUMENTS

| | | | |
|---|---|---|---|
| 282,436 A | * 7/1883 | Bowser | 254/92 |
| 2,310,255 A | * 2/1943 | O'Connell | 269/98 |
| 3,578,233 A | * 5/1971 | Meister et al. | 228/5.1 |
| 3,861,662 A | * 1/1975 | Morse | 269/17 |
| 4,447,049 A | * 5/1984 | Rudy | 269/46 |
| 6,003,830 A | * 12/1999 | Egan | 248/676 |

OTHER PUBLICATIONS

Lisle 25700 Engine Hanger Supplement, 1985.
OTC, Part No. 1724, Transverse Engine Support Bar, p. 149, May 1998.
OTC, Parts List and Operating Instructions, Part No. 1722, Sheet 1, Dec. 7, 2000.
OTC, Parts List and Operating Instructions, Part No. 214068, Sheet 1, Sep. 18, 1996.
Snap–On Catalog 600, Part No. YA2670, Engine Hoist, p. E96, Jul. 2001.
Instruction Sheet for Blue–Point® Mini–Pic, Part No. YA 2670, Apr. 1993.
Keyes Manufacturing web site, www.keyesmfg.com, Mini–Pic, 3 in 1 Hoist Holding Device Engine Tilter, Nov. 20, 2002.
Web site www.posertrainequipment.com, Nov. 27, 2002.
Invention Disclosure Agreement with Vince Cassaniti, Engine hanger that is used with front wheel drive vehicles, Jul. 11, 1990.
Invention Disclosure Agreement with Guy Navaud, Engine hanger, Sep. 12, 1995.
Invention Disclosure Agreement with John Togher, Engine for front wheel drive, Nov. 7, 1996.

* cited by examiner

*Primary Examiner*—Lee D. Wilson
(74) *Attorney, Agent, or Firm*—Banner & Witcoff, Ltd.

(57) ABSTRACT

A support frame assembly for supporting an engine in a vehicle engine compartment including a telescoping support beam supported by foot members which are adjustable to accommodate the configuration of the fender lips of the engine compartment. Adjustment of the support foot members relative to the horizontal cross beam may be effected in two degrees of motion by virtue of the connection mechanism of the foot member to the support beam.

14 Claims, 4 Drawing Sheets

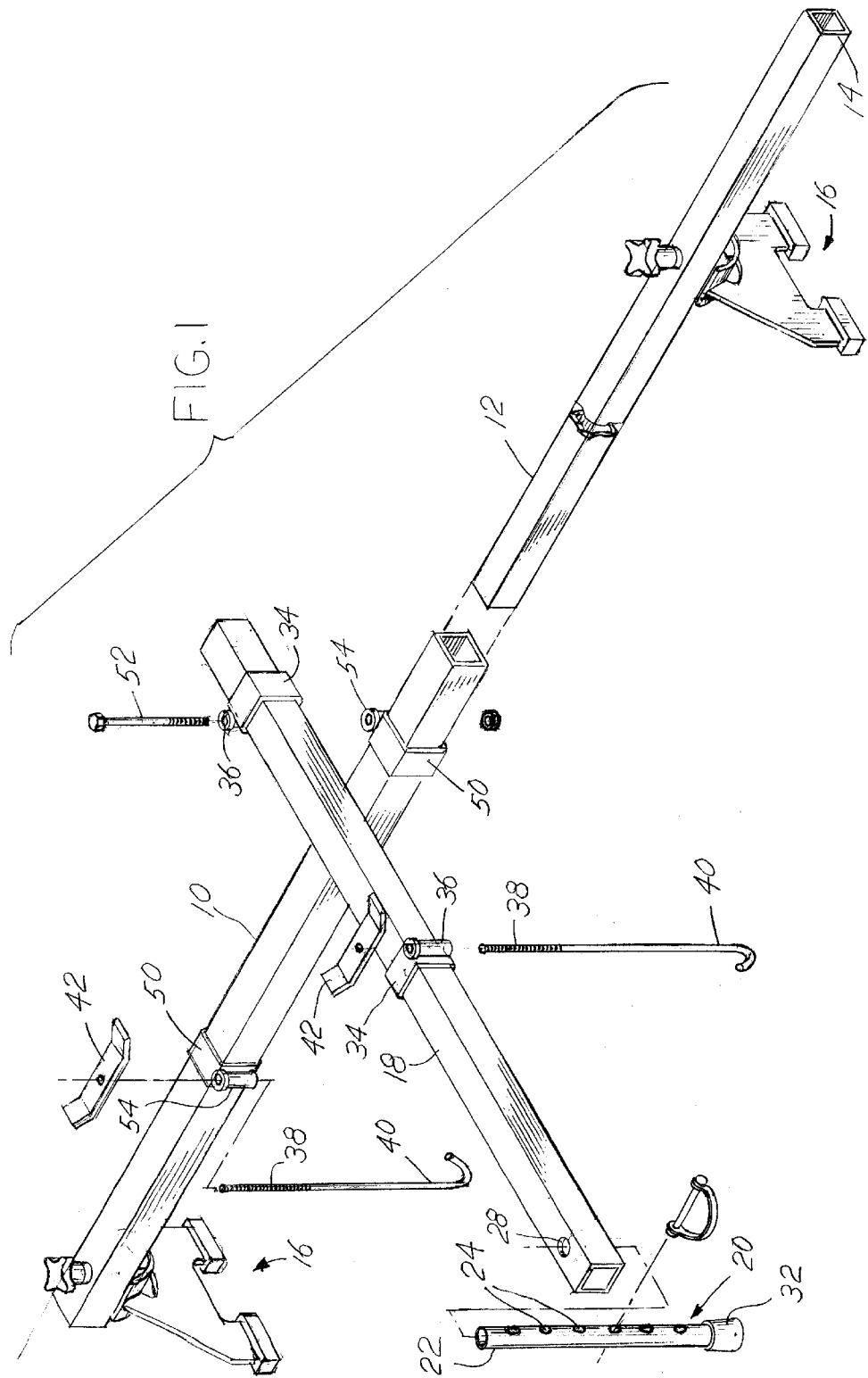

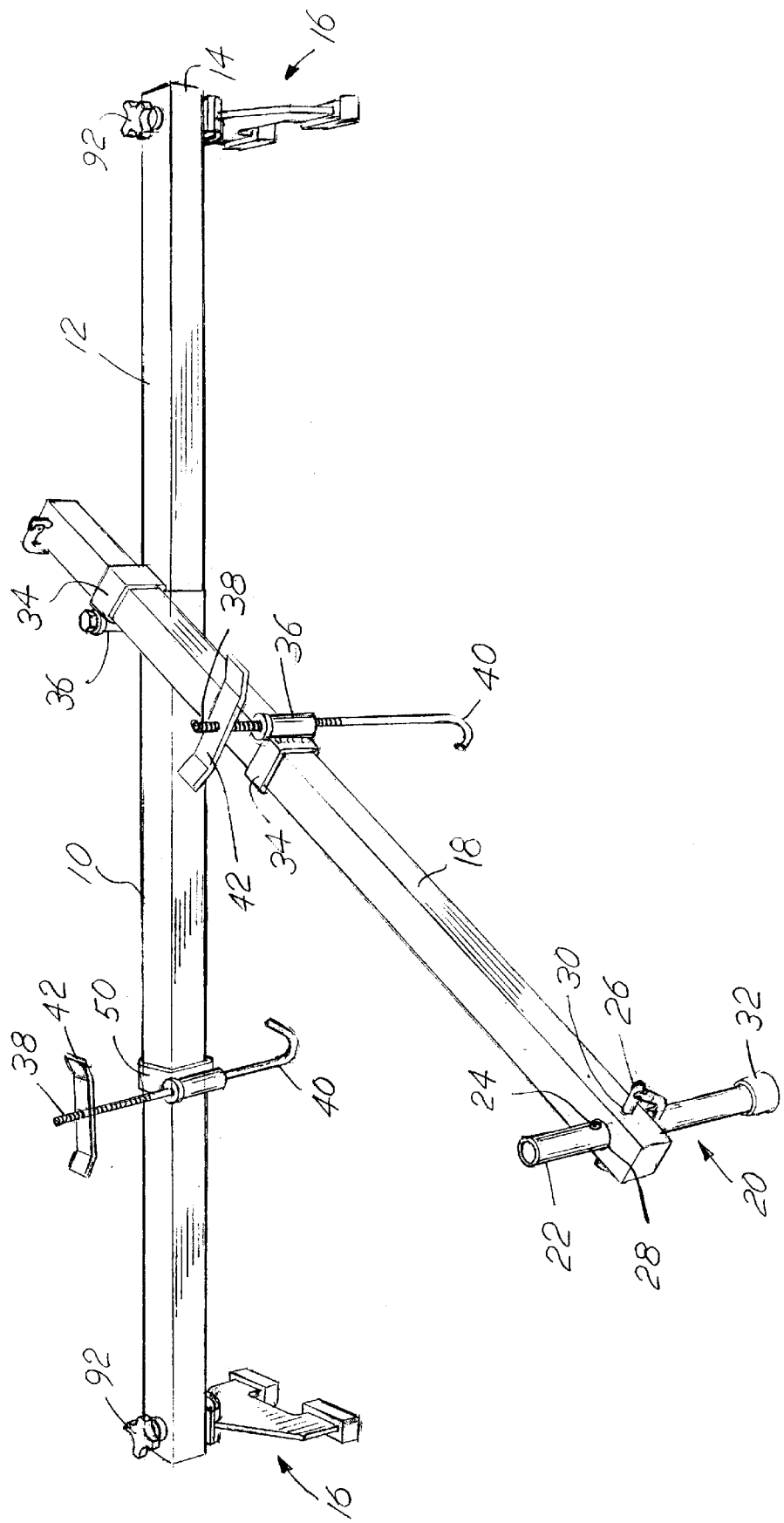

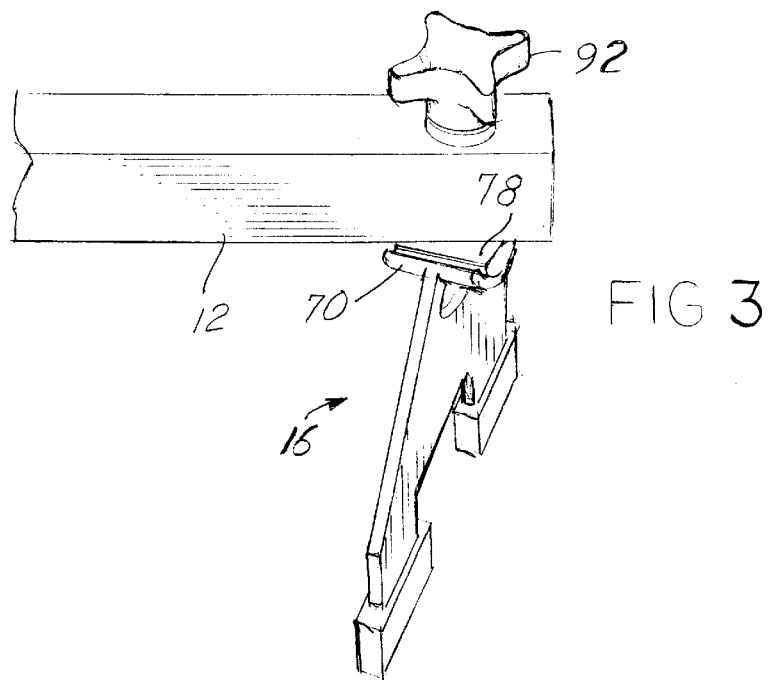
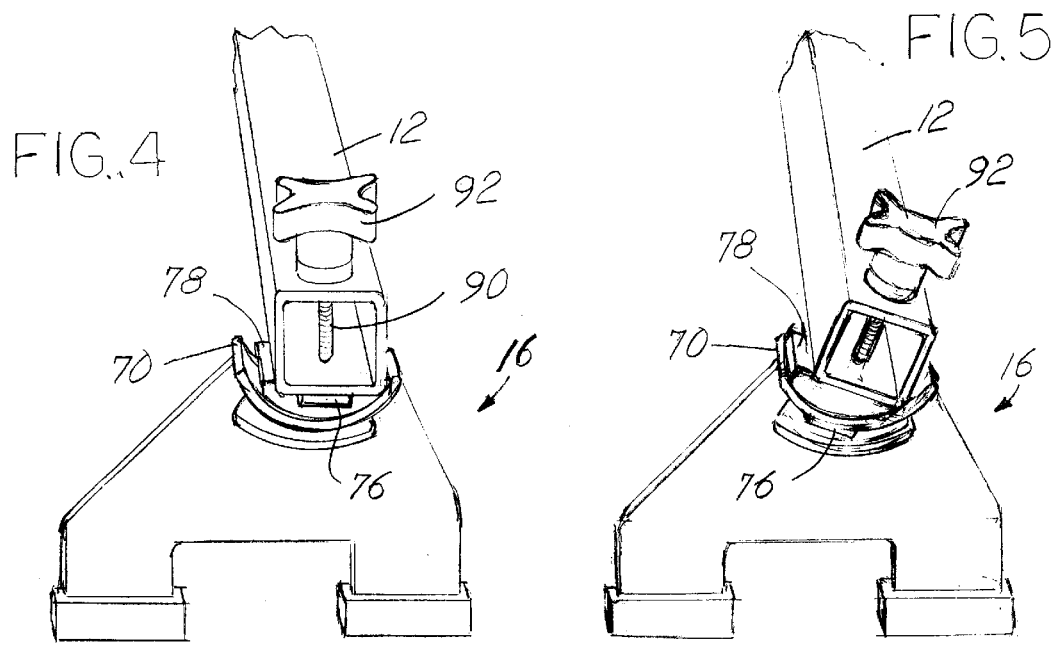

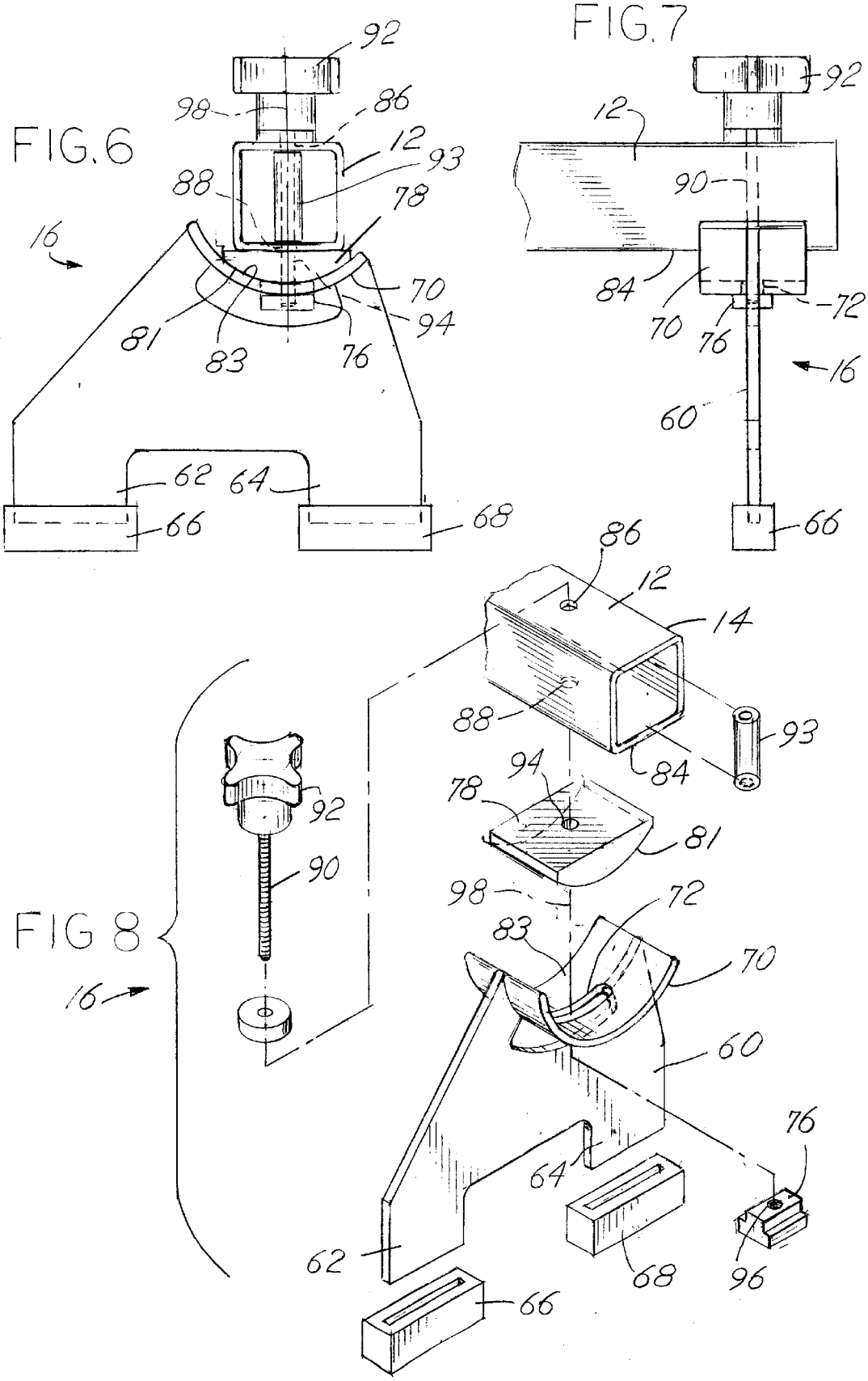

VEHICLE ENGINE HANGER

BACKGROUND OF THE INVENTION

The principal aspect of the present invention relates to an apparatus for supporting a vehicle engine in the vehicle engine compartment when the engine is disconnected from its engine mounts, for example, for service or repair.

Repair of the transmission of a vehicle or the vehicle engine itself may often be effected while the engine remains in place in the engine compartment of the vehicle. In order to facilitate such repair or service, various devices have been developed to support the engine in the engine compartment during servicing. Typically, such devices comprise a framework of the various connected beams, which includes legs or supports mounted on the sides or lips of the engine compartment and/or on the radiator support at the front of the engine compartment. These beams generally include depending hangers such as hooks, chains or links, which connect to or engage the engine thereby enabling removal of the engine mounts and servicing of the engine or the transaxle or transmission of associated with the engine. Typical, of such engine hanger or support constructions is a product offered by Lisle Corporation of Clarinda, Iowa as its Model No. 25700 Engine Hanger. Numerous other engine hanger devices are available in the marketplace. For example, SPX Corporation of Owatonna, Minn. offers an engine support bar which includes telescoping polygonal tubes mounted on legs or supports with engine hooks depending therefrom for attachment to an engine. Thus, various products are of this type available in the marketplace including the following:

SPX Corporation transverse engine support bar Part 1724;

SPX Corporation support bar Model No. 1722;

SPX Corporation support bar Model No. 214068;

Snap On Corporation support assembly Model No. YA2670;

Power Train Equipment engine hanger; and

Miller Special Tools C-4852 engine support Catalog No. M-1151.

While the devices disclosed for such engine support are considered extremely useful, a problem arises when attempting their use in certain circumstances inasmuch as many vehicles, including vans, employ an engine compartment having a configuration which is not easily susceptible to installation and use of an engine support apparatus. That is, an engine compartment is typically defined by the front radiator support assembly and fender lips or shoulders on opposite sides of the engine compartment. Many vehicles incorporate a fender shoulder or lip, or a fender side, which slopes inwardly and downwardly toward the forward end of the vehicle engine compartment. As a consequence appropriate positioning and maintenance of the position of an engine support apparatus for supporting an engine within an engine compartment becomes extremely challenging. Thus, there has developed a need for an engine support system or apparatus for supporting an engine within the engine compartment of a vehicle which apparatus accommodates the various configurations and shapes of the engine compartment.

SUMMARY OF THE INVENTION

Briefly, the present invention comprises an engine support frame or apparatus for supporting a vehicle engine in the engine compartment of the vehicle wherein the compartment includes a fender lip on each of the opposite sides of the engine compartment and a radiator support at the forward end of the compartment. The engine support apparatus is comprised of a telescoping beam, which enables adjustment in length to accommodate or permit adjustment with respect to the width of the engine compartment which the beam will span. The engine support frame further includes specially constructed legs or feet at the opposite ends of the support beam. The legs are designed to allow adjustment in two degrees of motion; namely, an adjustment with respect to yaw or from side to side movement and an adjustment with respect to roll. The special legs or feet each include an arcuate saddle, which cooperates with a support pad affixed to the support beam. The support beam may be pivoted from side to side about the support pad to control the yaw of the beam relative to the foot. Further, the support pad may be adjusted within its arcuate saddle to control the roll of the beam relative to the foot. By virtue of such control, the beam may be maintained in a desired horizontal orientation and position over the engine and engine compartment since each foot may be adjusted relative to the beam to accommodate variances in the shape and configuration of the fender lips of the engine compartment.

In a preferred embodiment, the foot construction is provided at each end of the telescoping engine support beam so that the beam may be adjusted with respect to both sides of the engine compartment to thereby maintain the beam in a desired, generally horizontal engine support orientation. Further, a cross beam may be suspended between the main engine support beam and the front radiator support to provide a further engine support by attachment of hooks and other support elements to the engine.

Thus, it is an object of the invention to provide improved engine support frame or apparatus for suspending a vehicle engine in the engine compartment of a vehicle.

A further object of the invention is to provide an engine support frame construction, which permits adjustment of a support beam for the engine relative to feet which support the beam on the sides of the engine compartment and thereby accommodate variances in the shape and configuration of the engine compartment.

Yet another object of the invention is to provide an engine support frame, which provides for adjustment of the orientation of the support beam of the assembly in at least two degrees of motion or movement.

Yet a further object of the invention is to provide an engine support frame, which can be easily adjusted to accommodate the configuration of the engine compartment and quickly lock into position by a manual operation.

Yet another object of the invention is to provide an engine support frame, which may be utilized with J-hooks, chains, links, right-angle brackets and various other types of other engine support elements.

A further object of the invention is to provide an engine support frame, which includes pivoting support legs, which pivot in one or more directions to provide secure support of the engine support frame assembly on a wide variety of engine compartment configurations.

Another object of the invention is to provide an especially rugged yet easily adjustable engine support frame assembly.

These and other objects, advantages and features of the invention will be set forth in the detailed description which follows.

BRIEF DESCRIPTION OF THE DRAWING

In the detailed description which follows reference will be made to the drawing comprised of the following figures:

FIG. 1 is an exploded isometric view illustrating the component parts of the engine support frame of the invention;

FIG. 2 is an isometric view of the engine support frame assembly of FIG. 1 wherein all of the component parts had been assembled;

FIG. 3 is an isometric view of the foot construction, which provides for adjustment of the foot relative to the horizontal beam of the engine support system or apparatus;

FIG. 4 is an isometric end view of the foot of FIG. 3;

FIG. 5 is an isometric end view of the foot of FIG. 4 wherein an adjustment with respect to roll has been implemented and further illustrating the manner of adjustment with respect to yaw or side to side movement of the beam relative to the foot of the assembly;

FIG. 6 is an end view of the foot assembly of FIG. 4;

FIG. 7 is a side view of the assembly of FIG. 6; and

FIG. 8 is an exploded isometric view of the foot assembly of FIG. 6.

DESCRIPTION OF THE PREFERRED EMBODIMENT

FIGS. 1 and 2 illustrate the component parts of the engine support apparatus including first and second telescoping horizontal beam members supported by feet at their opposite ends. The feet rest on the opposite sides of the engine compartment or the fender lips or shoulders. A cross beam extends from the main horizontal beam to the front radiator support. FIGS. 3 to 8 illustrate in greater detail the construction of the feet, which are provided at the opposite ends of the horizontal, telescoping support beams. In the embodiment depicted the feet are shown as being associated with only the horizontal support beam which extends between the opposite sides of the fender lips. However, any auxiliary support bar or cross beam may include such a foot construction.

Referring first to FIGS. 1 and 2, the support assembly includes a first telescoping beam 10 and a second telescoping beam 12. The second beam 12 slidably telescopes within the first beam 10. The horizontal support beams 10 and 12 are polygonal in cross section and preferably formed from hollow, square cross section tubular material. The outer ends, such as outer end 14 of beam 12, include a support foot or leg 16 associated therewith. In the embodiment depicted, a support foot or leg 16 is associated with the free or outer end of each horizontal cross beam 10 and 12.

An auxiliary cross beam or auxiliary support bar 18 is provided and connects from a foot 20 to the telescoping beams 10 and 12. In the preferred embodiment the foot 20 comprises a tubular member 22 having a series of six horizontal passages 24 for receipt of a locking pin 26. The tubular member or rod 22 fits through a vertical opening 28 in the end of the cross beam 18, and the locking pin 26 will then pass through a desired passage 24 through the rod 22 to hold the rod 22 in a desired position relative to the cross beam 18. A cushion support pad 32 is provided on the outer or support end of the rod 22 for engaging against the radiator support in an engine vehicle compartment.

The telescoping beams 10 and 12 as well as the cross beam 18 may include one or more support assemblies for supporting or engaging an engine or engaging a link attached to an engine or for engaging a chain which is attached to or around the engine. Typically, such support members comprise a support bar bracket 34, which is slidably received on one of the telescoping beams 10, 12 or 18. The bracket 34 includes a bushing, for example a bushing 36, through which the end 38 of a J-hook 40 may be inserted. A speed knob or nut 42 threaded onto the threaded end of the hook 40 will retain the hook 40 at the desired extended length or distance from the support bar bracket 34. Such a support bracket 34 may be utilized in combination with any of the support beams 10, 12 or 18. The support beams 10 and 12 may also be locked together by means of pins (not shown) through openings (not shown) in the support beams 10 and 12. Further, the cross beam 18 may be attached to the top side of the telescoping beams 10 and 12 by means of a pin or by means of a slide 50 with a bolt 52 which fits through a bushing 54 associated with the beam 10. That is, the bolt 52 will extend through the bushing 36 of the bracket 34 and then through the bushing 54 of the bracket or slide 50 to hold the cross beam 18 in a fixed position relative to the cross beams 10 and 12.

The subject matter of the invention relates particularly to the construction of the feet or legs 16 associated with the engine frame support assembly. FIGS. 3–8 illustrate in greater detail the construction of the feet or legs 16 and the manner in which those feet or legs may be adjusted relative to the beams 10 and 12 to accommodate various configurations of the engine compartment of vehicles. Specifically, the feet or legs 16 include a foot member 60 which includes spaced leg sections 62 and 64 having cushion pads 66 and 68 respectively affixed thereto. The leg sections 62 and 64 are spaced in order to provide enhanced support by the leg assembly 16. The leg assembly 16 further includes an arcuate saddle 70 having an arcuate cam slot 72. A slot 74 cut in the foot member 60 beneath the cam slot 72 is provided for receipt in sliding movement of a cam or slot nut 76. The slot nut or T-nut 76 rides within the slot 72 which is described hereinafter.

A beam support pad 78 having convex arcuate surface 80 slidably fits in the arcuate saddle 70. Convex surface 80 is compatible with the concave surface 83 of the saddle 70. The support pad 78 further includes a planar flat top surface 82, which fits against underside surface 84 of the beam 12. The beam 12 and its outer end 14 includes openings 86 and 88 for receipt of a threaded stud or rod 90 having a turn knob 92 affixed thereto. The stud or rod 90 fits through the openings of 86 and 88. An optional bushing 93 may be fitted over rod 90. The rod 90 further fits through an opening or throughpassages 94 in the support pad 78 and is threaded into a threaded opening 96 in the cam or slot nut 76. The cam or slot nut 76 fits on the underside of the saddle 70 and, when the knob 92 is turned, the nut 76 is tightened so that the beam 12 support pad 78 and saddle 70 are compressed tightly together to hold the assembly in a desired fixed configuration.

Adjustment of the roll or rotation of the beam 12 relative to the foot 16 is accomplished by loosing the knob 92 and moving the support pad 78 relative to the saddle 70 by sliding movement of T-nut 76 will slide in the cam slot 72. The foot 16, and more particularly foot member 60, for example, may be adjusted from the position depicted in FIG. 4 to a position, for example, as depicted in FIG. 5. Further, the foot 16 may be rotated about axis 98 of the rod 90 and thus with respect to the beam 12. That is, flat surface 82 of the support pad 78 and the flat surface 84 on the bottom side of the beam 12 enable rotation or movement in the sense of yaw of the foot member 60 with respect to the beam 12. Again, this is accomplished when the knob 92 is loosened or released to enable adjustment of the foot 16 relative to the beam 12.

Thus with such a described construction, roll or rotation of the beam 12 relative to the foot member 60 may be accomplished as well as the rotation about the axis 98 and thus rotation (yaw) of the foot 60 relative to the beam 12 may be accomplished. In this manner, the foot, and more particularly the cushioned pads 66 and 68, may be appropriately placed on a fender lip of a vehicle engine compartment and then the beam 12 adjusted to a desired orientation. The device therefore enables adjustment in two planes or two degrees of movement or motion to accommodate variations in engine compartment configuration.

It is possible to vary the construction. For example, the arcuate shape of the support pad may be concave and the support saddle may be convex. The configuration of the cam slot 72 and the cam slot or T-nut 76 may be altered or varied. Thus, various alternative constructions are considered to be within the scope of the invention and the invention is to be limited only by the following claims and equivalents.

What is claimed is:

1. An engine support frame for suspending a vehicle engine in the engine compartment of a motor vehicle, said compartment including a fender lip on opposite sides of the engine compartment, said frame comprising, in combination:
   a first foot member for placement on one of said fender lips, said first foot member including an arcuate saddle;
   a second foot member for placement on the other said fender lips,
   a support beam having a first arcuate support pad for placement in the first foot member arcuate saddle; and
   an adjustable fastener mechanism for holding said first pad in an adjustable orientation with respect to the first foot member saddle to control the angle of roll of the beam relative to the foot member, said second foot member engaging and supporting the support beam.

2. The frame of claim 1 further including an engine support element suspended from the beam.

3. The frame of claim 1 further including a cross beam assembly attached to the support beam; and
   a foot for the cross beam assembly for supporting the cross beam assembly on the engine compartment.

4. The frame of claim 3 further including a slide mechanism for attaching the cross beam to the support beam.

5. The frame of claim 1 including at least one slidably mounted slide on the support beam for movement lengthwise of the support beam.

6. The frame of claim 1 wherein the support beam has a polygonal shaped cross section.

7. The frame of claim 1 further including at least one engine support hook attached to the support beam.

8. The frame of claim 1 further including an engine support element attached to the support beam, said element including a mechanism for engaging an engine.

9. The frame of claim 8 wherein said support element is selected from a group consisting of a link, a chain, a hook and combinations thereof.

10. The frame of claim 1 wherein said arcuate saddle is concave and said arcuate support pad is convex and nests in the saddle.

11. The frame of claim 1 wherein the fastener mechanism includes a slot in the foot member, and a slot nut fitted into the slot with a rod extending from the slot nut through the support pad and support beam, and for securing the pad at a fixed position in the saddle.

12. The frame of claim 1 wherein said foot member includes first and second spaced cushion pads for engaging a side of the engine compartment.

13. The frame of claim 1 including at least first and second foot members of substantially identical construction.

14. The frame of claim 1 wherein the support beam is comprised of telescoping beam members.

* * * * *